Oct. 18, 1938.   N. C. PRICE   2,133,569
FLUID ACTUATED VALVE MECHANISM
Filed May 11, 1937   3 Sheets-Sheet 1
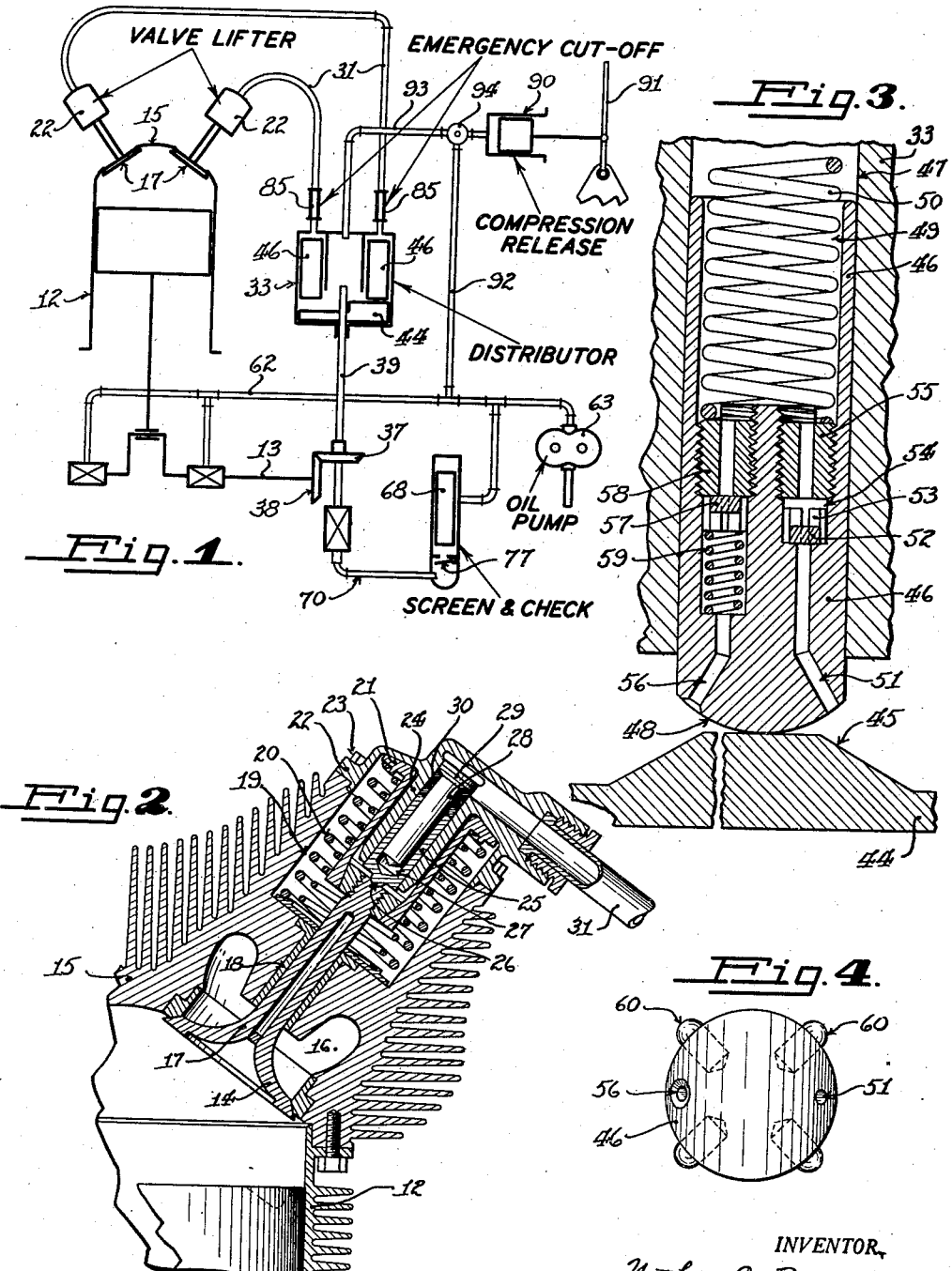

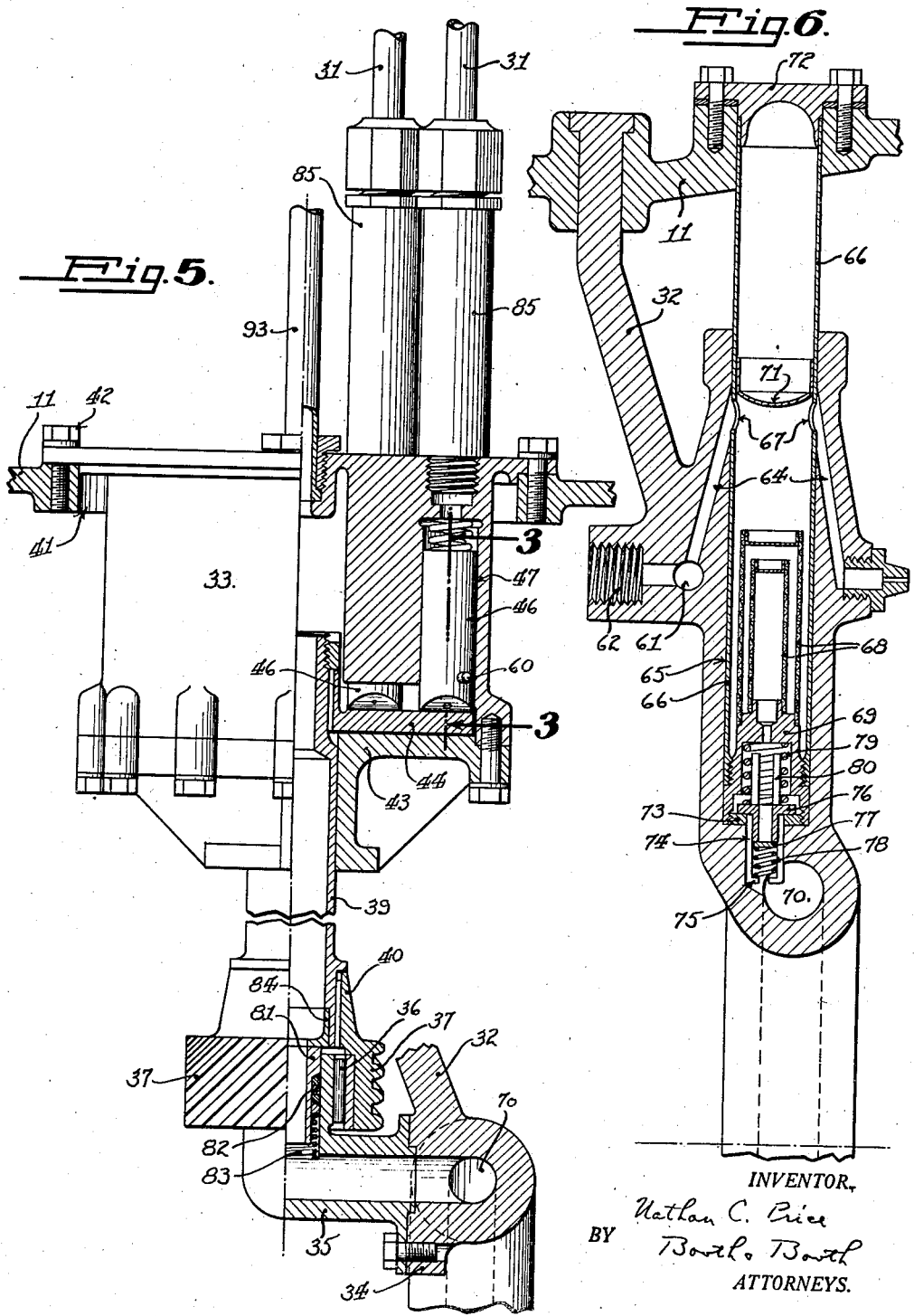

Oct. 18, 1938.   N. C. PRICE   2,133,569
FLUID ACTUATED VALVE MECHANISM
Filed May 11, 1937   3 Sheets-Sheet 3

INVENTOR,
Nathan C. Price
BY Booth & Booth
ATTORNEYS.

Patented Oct. 18, 1938

2,133,569

UNITED STATES PATENT OFFICE 2,133,569

FLUID ACTUATED VALVE MECHANISM

Nathan C. Price, Berkeley, Calif., assignor to Universal Engine and Propeller Co., Alameda, Calif., a corporation of California Application May 11, 1937, Serial No. 142,002

10 Claims. (Cl. 123—90)

The present invention relates to fluid actuated valve operating mechanism for internal combustion engines. The invention will be described and illustrated herein as applied to an aircraft engine having a plurality of cylinders arranged radially about a common propeller shaft. It will be apparent, however, to those skilled in the art that the invention may be embodied, without material alteration, in engines of other types, and it is to be understood that the embodiment herein is illustrated and described merely as a typical example of the essential principles of the invention. It is also to be understood that changes, within the scope of the claims hereto appended, may be made in the form, construction and arrangement of the several parts, without departing from the spirit of the invention as defined in said claims.

One of the principal advantages of the invention is that it enables the use of a shorter valve stem and a more compact structure surrounding the outer end of said stem than is possible with the use of a mechanical lifter mechanism. Where the valves are mounted in the cylinder head, as is customary in many different types of engines, the use of a compact self-contained fluid lifter mechanism, as described hereinafter, permits a hemispherical domed cylinder head and the positioning therein of valves at the optimum angle from a thermodynamic standpoint. In radial engines it also reduces the over-all radial dimension of the engine.

Another advantage of the invention is that it provides means for automatically lubricating the valve stem from the small normal leakage of oil past the plunger of the lifter device. As the entire lifter mechanism is enclosed, this small leakage is confined to the space between the valve stem and its guide, and there is no exterior leakage of oil. Another advantage of the invention is that there is no necessity for clearance between the lifter plunger and the end of the valve stem. The valve is lifted by a surge column of oil extending from a distributor pump mechanism to the valve stem plunger. The system is maintained full of oil at all times, eliminating any clearance at any point, and the slight compression of the oil in the column provides sufficient cushioning effect to cause rapid but smooth opening and closing of the valve without bouncing.

A further advantage of enclosing the lifter lies in the fact that the valve spring chamber operates at the same average pressure as that of the valve port. This prevents leakage of exhaust gas into the valve spring chamber of the exhaust valve, and the flow of air with oil vapor particles into the port of the inlet valve, thereby preventing much useless transfer of heat to the exhaust valve spring chamber and wasteful loss of oil to the intake valve port.

A further object of the invention is to provide simple and easily operated means for releasing compression of the engine by holding all the valves off their seats. This feature, which is useful in starting an engine, is accomplished by increasing the pressure of the oil in the entire surge system.

A further object of the invention is to provide a distributor pump mechanism for producing the surges in the columns of oil leading to the lifters of the several valves at the proper times in the cycle of operation, and to provide said distributor pump with means for constantly and automatically replenishing its oil supply from the ordinary engine lubrication system. The distributor pump mechanism is easily removable from its mounting in the engine crank case so that all parts of the valve system are readily accessible. A further object of the invention is to provide various safety features to prevent damage from over pressure of oil in the system, or from entrapped air or solid particles in the oil, and to prevent loss of oil and failure of the entire system in the event of the breakage of any one surge line.

A typical embodiment of the invention will be fully described with reference to the accompanying drawings, in which Fig. 1 is a schematic diagram of the system as applied to the valves of one cylinder of an engine.

Fig. 2 is a section of the upper portion of one of the cylinders showing a valve and its lifter mechanism.

Fig. 3 is a vertical section of one of the distributor pump plungers, taken on the line 3—3 of Fig. 5.

Fig. 4 is a bottom end elevation of one of the plungers of the distributor pump.

Fig. 5 is a part sectional elevation of the distributor pump.

Fig. 6 is a longitudinal section, enlarged, of the screen and check and relief valve mechanism in the oil supply line.

Figure 7:
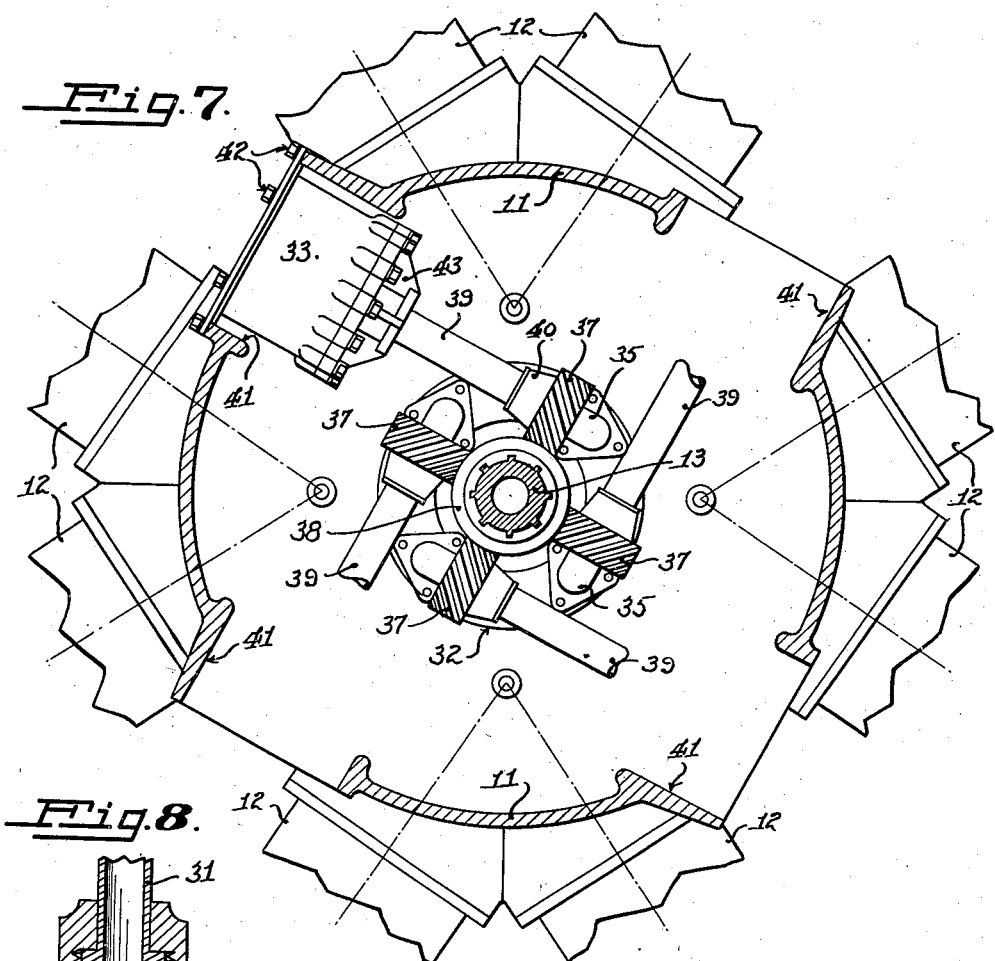
Fig. 7 is a broken transverse section through the crank case of a radial type engine, showing the arrangement of one of the distributor pump heads therein.

Referring for the moment to Fig. 7 of the drawings, the reference numeral 11 designates the crank case of an engine of radial type, which is approximately cylindrical, and has, at various points about its periphery, bosses or pads upon which the cylinders 12 are mounted. The particular number and disposition of cylinders is immaterial, as is the means for connecting their pistons with the main central shaft 13 of the engine.

Each cylinder 12 has the usual valves, one of which is shown at 14 in Fig. 2. In the engine herein illustrated, the valves are mounted in the semi-spherical head 15 of the cylinder. 16 is the valve port for intake or exhaust, as the case may be. The stem 17 of the valve extends through a guide bushing 18 into a chamber 19 which houses the valve springs 20. Attached to the end of the valve stem 17 is a recessed washer 21 which has a flange bearing against the outer ends of the springs.

A cap 22 covers and tightly closes the spring chamber 19, and is secured to the head by bolts 23. The cap 22 has a cylindrical projection 24 which extends into the recess in the spring washer 21, and forms a cylinder for a slidable plunger 25, which has a hemispherical end 26 bearing against the end of the valve stem 17.

The plunger 25 is preferably formed in two parts, a body or lower part having an axial bore 27 and a stem 28 slidably received therein. A head 29 is formed on the outer end of said stem, the diameter of the head and the body 25 being the same. Packing 30 is interposed between the end of the body and the head 29. The packing 30 minimizes loss of oil around the plunger, and is automatically kept tight by the pressure of the oil against the head 29. The small amount of oil that leaks past the packing 30 and the plunger body 27 finds its way to the valve stem 17 and lubricates said stem in its guide 18. In as much as the outer end of the spring chamber 19 is closed by the cap 22, the pressure within said chamber is the same as that in the valve port 16. Hence there is no leakage of gas past the valve stem, and a minimum transfer of heat in the case of the exhaust valve from the port to the spring chamber.

Oil is supplied through surge pipes 31, under proper pressure and at proper times, to the cylinders of the various valve lifter plungers by one or more distributor pump mechanisms, which will now be described. The number of said distributor pumps will depend upon the number of cylinders in the engine, and their positions and manner of mounting and driving will depend upon the type and construction of the engine in which they are used. In the engine herein illustrated, I have shown an interior transverse web 32 in the crank case 11, and upon this web I have mounted a plurality of distributor pumps, one of which is shown at 33 in Fig. 7 and in detail in Fig. 5.

The web 32 has a boss or pad 34 in its central region to which is bolted an elbow like fitting 35. A roller bearing 36 surrounds the outer arm of the fitting 35 and mounts a helical gear 37 which meshes with a corresponding gear 38 (Fig. 7) secured upon the central shaft 13. A hollow cam shaft 39 is keyed within the hub 40 of the gear 37 and extends outwardly toward the rim of the crank case 11. Said rim is provided with a flanged opening 41 within which is secured, by means of bolts 42, the distributor pump head 33. The hollow shaft 39 extends rotatably through the inner end 42 of the distributor head, and has keyed to it a cam disk 44, Fig. 5, whose upper surface is provided with one or more face cams 45, Fig. 3, which operate the pump plungers 46. The number and spacing of plungers in each distributor head will depend upon the number of valves to be operated thereby. The head 33 is provided with cylinders 47, in each of which one of the pump plungers 46 is slidably mounted, and each cylinder 47 is connected with its respective valve lifter by one of the pipes 31.

A description of one pump plunger will suffice for all. Referring to Fig. 3, the lower end of the plunger 46, which rides upon and is operated by the cam 45, is preferably cylindrical, as indicated at 48. The upper end of the plunger is hollowed out, as indicated at 49, to reduce its weight, and to receive a spring 50 which holds it against the cam 45. An oil inlet passage 51 leads from the lower end of the plunger to the upper chamber 49 and is positioned at one side of the longitudinal center. The passage 51 is enlarged at its upper end and houses a check valve preferably in the form of a wafer 52 having slotted lugs 53 which ride in the enlarged portion 54 of the passage 51. A cored plug 55 is screwed into the upper end of the enlarged passage 51 to hold the check valve in place. The check valve permits upward flow through the passage 51 but prevents reverse flow.

At the other side of the plunger 46 is a passage 56 in which is a relief valve, preferably formed as a wafer 57 similar to the check wafer 52 but inverted to seat upwardly against an apertured plug 58 screwed into the upper end of said passage. A spring 59 holds the valve 55 to its seat. The relief valve permits downward flow through the passage 56 when the pressure above the plunger rises above the normal operating point. Pins 60, Fig. 4, project laterally from the plunger 46 and slide in corresponding grooves, not shown, to prevent rotation of said plunger.

It will now be seen by reference to the diagram of Fig. 1 that there is a closed surge system extending from each plunger 46 of the distributor pump to the corresponding plunger of the valve lifter. The raising of the distributor plunger 46 by the cam causes the valve lifter to open the valve, the oil within the surge pipe 31 acting as a push rod. After the cam moves away from beneath the distributor plunger, the valve springs close the valve and move both plungers back to their original positions. There is, however, some leakage of oil past the plungers of the surge system and, in order to replace the oil thus lost through leakage, means are provided for supplying fresh oil under substantially constant but comparatively low pressure to the interior of the distributor head 33. The oil thus supplied is drawn automatically from the lubrication system of the engine and the pressure at which it is supplied is the normal operating pressure of said lubrication system.

In the engine herein illustrated by way of example, the web 32 of the crank case is provided with an annular channel 61, Fig. 6, which forms a part of the lubricating oil distribution system of the engine. Oil is supplied to said channel through a connection 62 from the lubricating oil pump of the engine (shown at 63 in Fig. 1), and is distributed from said channel 61 to various moving parts of the engine through suitable ducts, one of which is shown at 64 in Fig. 6.

The crank case web 32 is formed with a cylindrical socket 65, in which is removably mounted a substantially vertical tubular member 66 provided with opposite apertures 67 aligned with the oil duct 64 where it intercepts the socket 65. Within the lower portion of the tube 66 are a pair of fine meshed screens 68, positioned one within the other and secured upon a plug member 69 screwed into the lower end of the tube 66.

Within the plug 69 are a check valve to prevent reverse flow of oil and a pressure relief valve to prevent excess reverse pressure. Under normal operation, oil flows from the lubrication duct 64 into the tube 66, through the screens 68 and through the plug 69 and the check valve to be described presently, into a second annular channel 70 in the web 32. The screens 68 prevent both solid particles and air bubbles from passing into the valve lifter surge system with the lubricating oil. Any air that may be carried in said lubricating oil collects on the screens and eventually rises to the top of the tube 66, and is carried out through the lubrication duct 64. The tube is closed off above said lubrication duct by a plug 71, but the upper portion of said tube is extended to an aperture in the wall of the crank case 11, through which the entire tube with its screens and valves can be drawn out for repair or replacement. A removable cap 72 holds said tube in position.

A ring 73 is screwed into the lower end of the plug 69 in the bottom of the tube 66, and has a slotted downward extension 74 provided with an inwardly turned flange 75 at its lower end. A flanged valve member 76 has a tubular portion slidably mounted in the slotted guide portion 74 of the ring 73. A check valve in the form of a flat wafer 77 closes the lower end of the tubular portion of the member 76, and is held against its seat by a light spring 78. A heavy spring 79 is mounted between the valve member 76 and the plug 69, pressing said valve member downwardly against the seat ring 73 to form a relief valve. Guide lands 80 extend upwardly from the relief valve member 76 to limit its upward movement and to provide a guide for the spring 79. It will thus be seen that the normal downward flow of oil into the duct 70 passes through the check valve formed by the wafer 77. Excessive pressure in said duct 70, however, lifts both the wafer and the relief valve 76, permitting reverse flow of oil through the slots of the guide member 74.

The annular duct 70 communicates with and distributes the oil to the elbow fittings 35 of all the distributor pumps. From each of said elbow fittings, the oil flows upwardly through the tubular cam shaft 39 into the distributor head and enters the cylinder of each distributor plunger through the inlet port 51 thereof, as it may be required to replace loss of oil in the surge line.

Each distributor head and its cam shaft is removable from the outside of the crank case merely by removing its surge lines 31 and bolts 42. The entire distributor head 33, Fig. 5, its shaft 39, and its driving gear 37, can be drawn up as a unit. In order to permit separation of the shaft 39 from the elbow fitting 35, and to prevent leakage of oil at this point during operation, a bronze sleeve 81 is snugly fitted into the upturned portion of said elbow fitting. Packing 82 is provided in a recess in the outer surface of the bronze sleeve 81 and is kept tight by a spring 83. A steel bearing ring 84, hardened and ground on its lower face, is inserted in the tubular shaft 39, and rotates therewith. A thrust bearing is thus formed between the ring 84 and the upper end of the sleeve 81 to prevent leakage of oil, the sleeve being pressed upwardly against said ring by the spring 83. Upon withdrawing the shaft 39 and gear 37 upwardly, the sleeve 81 remains in the elbow fitting.

Figure 8:
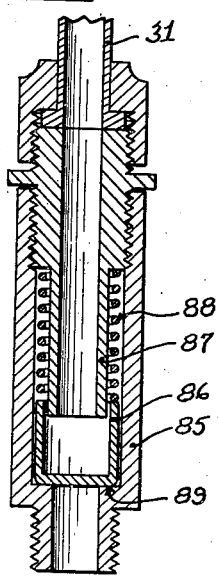
Fig. 8 is a longitudinal section, enlarged, of one of the emergency cut off valves of the surge lines.

Each surge line 31 between the distributor pump and the respective valve lifter is provided with an emergency cut off valve device 85, Figs. 5 and 8, designed to prevent loss of oil from the system as a whole in the event of failure of one surge line. This cut off device comprises a cup shaped valve 86, loosely slidable within the tubular body 85, and loosely fitting over the open end of an inner tube 87. A spring 88 holds said valve 86 against a shoulder 89 in the body. The dimensions of the valve 86 are such that the normal displacement of oil in each surge in the line is not sufficient to move said valve to its seat against the end of the tube 87. It therefore offers no appreciable resistance to the normal surge flow of oil. But if the line 31 should break, allowing the pressure within it to drop permanently, the valve 86 will be moved and held against the end of the tube 87 by the pump pressure, thereby preventing further loss of oil, and maintaining normal conditions in the rest of the system.

The system described herein lends itself easily to the inclusion of means for relieving the compression in all the cylinders of the engine, by holding all the valves open. This is accomplished by raising the oil pressure in all surge lines and holding it at a value sufficient to keep the valves open regardless of the action of the distributor pump. Any suitable means may be provided for accomplishing this result, and for purposes of illustration I have indicated, in Fig. 1, a pump 90 operated by a hand lever 91 and connected by pipes 92 and 93 with the lubrication line 62 and the interior of the distributor 33 respectively. A suitable manually operated valve is indicated at 94 for restoring the system to normal condition by releasing the excess pressure in the distributor 33. Thus when the pump 90 is operated, a small quantity of additional oil is drawn from the lubrication line and forced into the distributor 33, raising the pressure in said distributor and in the surge lines 31 sufficiently to open all the engine valves 17. The check valve 77 holds this excess pressure in the surge system. When, under these conditions, the engine is turned over, as for example by a starting motor, the relief valves 57 in the distributor plungers permit said plungers to move without damage to the surge lines. When it is desired to restore the system to normal condition, the manual valve 94 is opened momentarily, allowing the excess pressure in the distributor 33 to escape back into the lubrication line. Thus when starting the engine, its compression can be relieved until the starter attains maximum speed.

I claim:

1. In an engine having a cylinder with a valve therein, means actuated by oil under pressure for operating said valve, a pump operated by the engine for intermittently supplying oil under pressure, a conduit connecting said pump with said valve operating means and forming therewith a closed surge system, the instantaneous pressure in said conduit being normally substantially the same throughout its length, and a valve in said conduit for closing the same, said conduit valve being actuated by an abnormal pressure differential between the two ends of said conduit.

2. In an engine having a cylinder with a valve therein, means actuated by oil under pressure for operating said valve, a pump operated by the engine for intermittently supplying oil under pressure, a conduit connecting said pump with said valve operating means and forming therewith a closed system containing a surge column of oil having normal reciprocating flow, a valve seat in said conduit, a valve movable with said oil toward and away from said seat, and means for maintaining said valve away from its seat during the normal surge flow of said oil, but excessive oil flow causing said valve to seat and to close said conduit against further flow.

3. In an engine having a cylinder with a valve therein and a lubricating oil system, means actuated by oil under pressure for operating said valve, a pump operated by the engine for intermittently supplying oil under pressure, a conduit connecting said pump with said valve operating means and forming therewith a closed surge system, a substantially vertical hollow member having a passage through its upper end, said passage being included in a flow line of the engine lubrication system, a fluid connection between the lower end of said hollow member and said surge system for supplying oil to said surge system to compensate for leakage therefrom, and a screen in said hollow member between its upper and lower ends, said screen having a mesh of sufficient fineness to separate air bubbles from the oil passing therethrough into the surge system, the separated air bubbles rising in said hollow member and passing out into said lubrication flow line.

4. In an engine having a plurality of valves, fluid actuated means for operating each valve, a distributor pump for supplying fluid under intermittent pressure to said valve operating means, said pump comprising a body having a plurality of cylinders, a conduit connecting each cylinder with its corresponding valve operating means, a plunger in each cylinder, each plunger having means enabling fluid to pass through it longitudinally, a check valve in said plunger permitting fluid to flow from the interior of said body into the cylinder of said plunger, a relief valve in said plunger permitting reverse flow of fluid under conditions of excessive pressure in said cylinder, and means for supplying fluid to the interior of said body.

5. In an engine having a plurality of valves, fluid actuated means for operating each valve, a distributor pump for supplying fluid under intermittent pressure to said valve operating means, said pump comprising a body having a plurality of cylinders arranged with parallel axes, a conduit connecting each cylinder with its corresponding valve operating means, a plunger in each cylinder, a hollow shaft entering said body with its axis parallel with the axes of said cylinders, a face cam mounted on said shaft for engaging and moving said plungers, and means for supplying fluid to the interior of said body through said hollow shaft.

6. In an engine having a plurality of valves and a crankcase with a shaft therein, said crankcase having an aperture in its wall, fluid actuated means for operating said valves, a distributor pump for supplying fluid to said valve operating means, said pump being removably mounted in said aperture, a shaft for driving said pump, said pump shaft extending inwardly to the region of the engine shaft, and driving means connecting said pump shaft with said engine shaft.

7. In an engine having a plurality of valves and a crankcase with a shaft therein, said crankcase having an aperture in its wall, fluid actuated means for operating said valves, a distributor pump for supplying fluid to said valve operating means, said pump being removably mounted in said aperture, a hollow shaft for driving said pump, said hollow shaft extending inwardly and being driven by the engine shaft, and means for supplying fluid to the inner end of said hollow shaft and thence through said hollow shaft to said pump.

8. In an engine having a plurality of valves and a crankcase with a shaft therein, said crankcase having an aperture in its wall, fluid actuated means for operating said valves, a distributor pump for supplying fluid to said valve operating means, said pump being removably mounted in said aperture, a hollow shaft for driving said pump, said hollow shaft extending inwardly and being driven by the engine shaft, a hollow bearing member upon which the inner end of said hollow shaft is journalled, said hollow shaft being separable from said bearing member and removable with said pump, and means for supplying fluid to said pump through said bearing member and said hollow shaft.

9. In a radial type engine having a crankcase and a central shaft therein, said engine having a plurality of valves and said crankcase having a plurality of apertures in its wall, fluid actuated means for operating said valves, a plurality of distributor pumps for supplying fluid to said valve operating means, each pump being removably mounted in one of said apertures, a hollow drive shaft for operating each pump, said hollow shafts extending inwardly and being driven by the central shaft of the engine, a transverse web in said crankcase, said web having an annular fluid duct therein, bearing members mounted upon said web for supporting the inner ends of said hollow shafts, said bearing members having fluid passages connecting said annular duct with said hollow shafts, and means for supplying fluid to said pumps through said annular duct and said hollow shafts.

10. In an engine having a cylinder provided with a valve chamber, a valve seat, an exterior recess, and a valve stem guide extending from said chamber to said recess; a valve cooperating with said seat, said valve having a stem extending through said guide into said recess; a recessed member secured to the end of said stem, said member having a peripheral flange at its outer end; a spring acting between said flange and the bottom of the cylinder recess to hold the valve seated; a removable cap closing the outer end of said recess, said cap having an interior tubular projection extending into said recessed valve stem member, the interior of said projection forming a fluid cylinder; a fluid actuated plunger operating in said fluid cylinder and contacting said stem to unseat the valve; and means for intermittently supplying fluid under pressure to said fluid cylinder.

NATHAN C. PRICE.